June 2, 1942.  A. E. BENNETT  2,285,324
CHECK VALVE OPERATOR
Filed Nov. 12, 1941
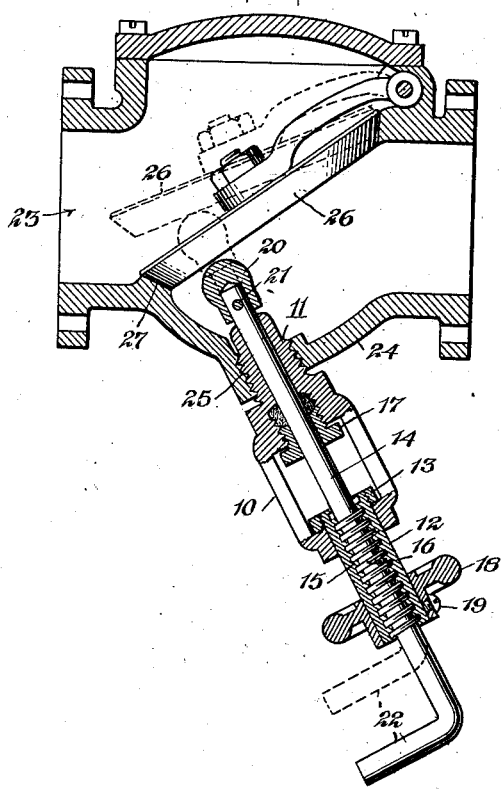
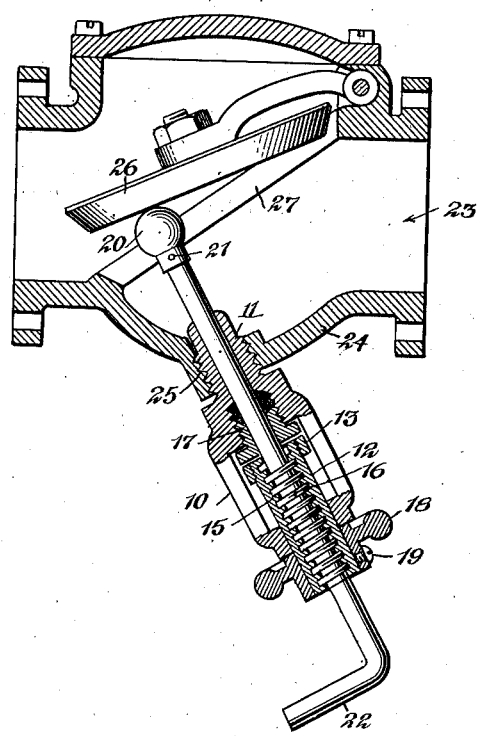
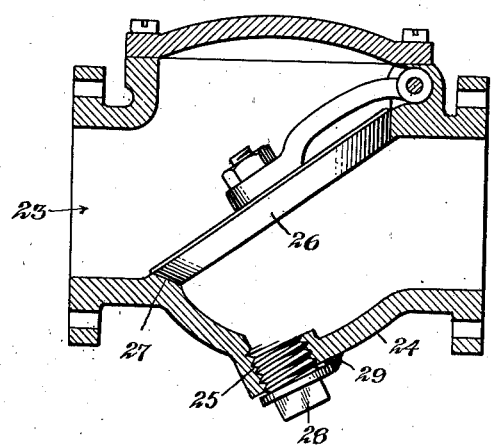
WITNESSES
INVENTOR
Alexander Edgar Bennett
BY
Munn, Liddy, Glaccum & Kane
ATTORNEYS Patented June 2, 1942

2,285,324

UNITED STATES PATENT OFFICE 2,285,324

CHECK VALVE OPERATOR

Alexander Edgar Bennett, New York, N. Y.

Application November 12, 1941, Serial No. 418,685

5 Claims. (Cl. 251—125)

This invention relates to a device which may be attached to a check valve for operating the valve member or flapper to uncheck the flow of fluid and to recheck said flow, and which device may be detached and the valve left in a condition in which the flow of fluid in one direction is checked and the valve cannot be tampered with to uncheck the flow.

An object of the invention is the provision of a device of the indicated character which may be used advantageously in conjunction with a check valve of a stand-pipe system for expeditiously making flow and pressure tests and wherein the device constituting a separate entity may be used as a tool to raise the valve member or flapper of the check valve in making the proper tests and which may be detached from the valve after completing the tests leaving the valve in its original state to thus prevent it from being tampered with or moving parts from going out of order.

The nature of the invention and its distinguishing features and advantages will appear when the following specification is read in connection with the accompanying drawing, in which Fig. 1 is a sectional view of the device of the present invention shown applied to a check valve selected to illustrate the invention and the manner in which the valve member or flapper is raised from its closed position shown in full lines to an open position shown in dotted lines;

Fig. 2 is a view similar to Fig. 1 but showing an adjustment of parts of the device whereby the valve member may quickly and forcibly move against its seat to closed position;

Fig. 3 is a sectional view of the check valve with its casing plugged after the operator has been detached.

Referring now more particularly to the drawing, it will be apparent that the device includes a yoke 10 having a threaded nipple 11 on one end thereof. The other end of the yoke carries a sleeve 12 for rotation and axial movement and said sleeve 12 being in axial alinement with the nipple 11. A nut 13 is threaded on one end of the sleeve 12 within the yoke. A rod or stem 14 extends through the sleeve 12 and the nipple 11. The sleeve has internal threads 15 which coact with the threads 16 of the stem 14. A suitable stuffing box 17 carried by the yoke 10 surrounds the stem 14 to provide a fluid-tight joint between the yoke and the stem. A hand wheel 18 is mounted on the outer end of the sleeve 12 and this hand wheel may be integral with the sleeve, or be detachably secured thereto as in the present instance by a set screw 19. This makes it possible to remove the hand wheel 18 if desired. A globular knob 20 is secured to one end of the stem by a pin 21 or the like. The other end of the stem 14 has a laterally bent portion constituting a handle 22. The knob 20 constitutes a separate part of the stem in order that the sleeve 12 may be associated with the stem, and the nut 13 in the present instance is a removable part which enables the sleeve to be associated with the yoke 10.

In accordance with the invention, a check valve 23 of any standard type has the casing 24 thereof provided with a tapped hole 25 to receive the nipple 11, as shown in Figs. 1 and 2. The valve 23 includes the usual pivoted valve member or flapper 26 which is normally disposed on a conical seat 27 to check the flow of water or other fluid in one direction while allowing the same to flow through the valve in an opposite direction. In order to raise the valve member 26 off its seat to uncheck the flow of water, the handle 22 is manipulated to turn the stem 14, while the wheel 18 is gripped to prevent the sleeve 12 from turning, with the nut 13 bearing against the yoke 10. This will cause the stem 14 to move axially and the knob 20 to bear on the under side of the valve member moving the same to an open position as indicated in dotted lines in Fig. 1. Also, the wheel 18 may be rotated counter-clockwise to cause the stem 14 to move axially to move the valve member to the open position. The valve member 26 will be held in the open position so that the flow of water in a stand-pipe system, for instance, may flow toward a suitable outlet such as the usual Siamese connection, for the purpose of making flow and pressure tests. After making the proper tests the valve member is enabled to move quickly and forcibly on its seat. This is accomplished by grasping the handle 22 with one hand and holding the stem 14 against axial movement and, therefore, the valve member 26 in its open position. The hand wheel 18 is then manipulated with the other hand to cause the sleeve to move axially along the stem 14 by reason of the threads 15 and 16 to the position shown in Fig. 2. By releasing the handle 22 and the hand wheel 18, the valve member 26 under the pressure of the liquid may move quickly and forcibly to its seat 27 in which the flow of liquid is re-checked in order to build up the proper head in the stand-pipe system. The rapid and forceful closing of the valve member 26 removes any possible obstructions on the seat 27 and assures the proper checking of the flow of liquid.

After the completion of the tests the device in its entirety is detached from the valve casing 24 by unscrewing the nipple 11. A suitable threaded plug 28 is screwed into the hole 25 and if desired is held in place by some suitable means, as by a spot of welding 29 shown in Fig. 3. It will therefore be obvious, due to the fact that the device is detached from the valve and the tapped hole 25 is plugged, the valve will be left in its original state to prevent it from being tampered with or moving parts from going out of order.

I claim:

1. The combination with a check valve having a casing and a pivotal valve member, of a device detachably connected with said casing, said device including a screw turnable to move said valve member to open position and to hold the same therein, and said screw being movable axially without turning the same to allow said valve member to quickly and forcibly seat itself under pressure of fluid in said casing.

2. The combination with a check valve having a casing and a pivoted valve member, of a device detachably connected with said casing, said device including a yoke secured to the casing, a screw, a sleeve in threading engagement with said screw and being carried by said yoke for rotatory and axial movement, and means connected with said sleeve to rotate it to cause the screw to move axially to move the valve member to open position and to hold the same therein while said sleeve bears on said yoke, and said sleeve being rotatable on said screw to a set position whereby said screw and sleeve together may move axially to allow the valve member to quickly move to closed position on its seat under pressure of fluid in said casing.

3. A device for operating the valve member of a check valve comprising a yoke having means for attaching the device to the valve, a screw extending through said yoke, a sleeve in threading engagement with said screw and being carried by said yoke for rotatory and axial movement, and means connected with said sleeve to rotate it to cause the screw to move axially while said sleeve bears on said yoke to unseat the valve member and said sleeve being rotatable on said screw to a set position whereby said screw and sleeve together may move axially in a reverse direction to allow the valve member to seat itself.

4. A device for unseating the valve member of a check valve, for holding the valve member in open position and for enabling the valve member to seat itself under pressure of fluid in said valve, said device comprising a screw, means to support the screw so that one end may freely bear on said valve member, and a rotatable means engaged with said first means to move said screw axially in one direction to a set position and said rotatable means being adjustable on said screw to enable the screw to move axially in an opposite direction out of the set position.

5. A device as set forth in claim 4, wherein said screw has a handle to hold it from moving while said rotatable means is being adjusted

ALEXANDER EDGAR BENNETT.